No. 783,944. PATENTED FEB. 28, 1905.
C. C. FROST.
PACKING FOR STEAM JOINTS.
APPLICATION FILED AUG. 6, 1902. RENEWED JAN. 25, 1905.
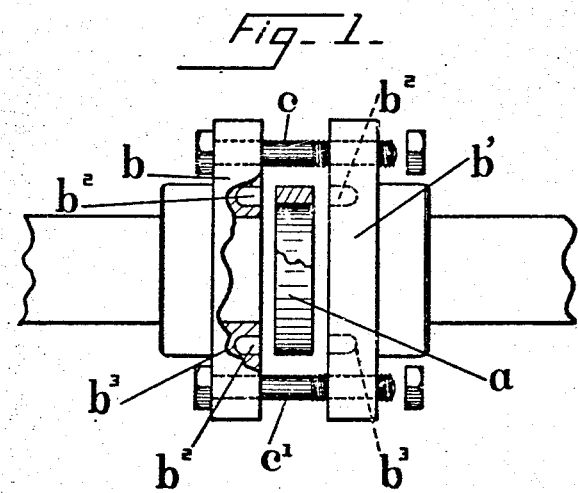
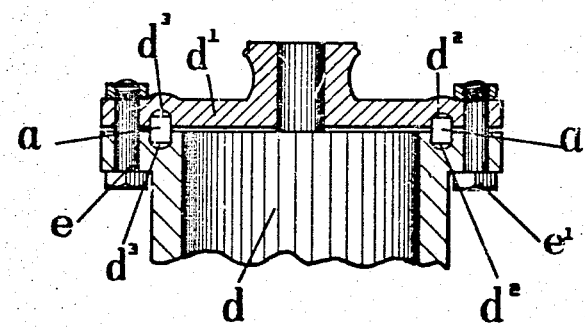
Witnesses
Frank S. Dewire
May F. Ritchie.
Clarence C. Frost, Inventor,
by Frank H. Allen
Attorney.

No. 783,944. Patented February 28, 1905.

UNITED STATES PATENT OFFICE.

CLARENCE C. FROST, OF NORWICH, CONNECTICUT, ASSIGNOR TO HIRAM R. MILLS, OF BLOOMFIELD, CONNECTICUT.

PACKING FOR STEAM-JOINTS.

SPECIFICATION forming part of Letters Patent No. 783,944, dated February 28, 1905.

Application filed August 6, 1902. Renewed January 25, 1905. Serial No. 242,673.

*To all whom it may concern:*

Be it known that I, CLARENCE C. FROST, a citizen of the United States, residing at Norwich, in the county of New London and State of Connecticut, have invented certain new and useful Improvements in Packings for Steam-Joints, of which the following is a full, clear, and exact description.

The purpose of this invention is to provide a tight joint for pipe-couplings, cylinder-heads, and the like places where steam, water, or air are confined under pressure.

In order to explain my said invention understandingly, I have provided the accompanying sheet of drawings, in which—

Figure 1 illustrates, partly in section, a flanged union for connecting the meeting ends of pipes, said union having embodied therein a packing of my improved form, the flanges being shown separated from each other. In Fig. 2 I have illustrated a portion of a cylinder and cylinder-head having suitably combined therewith my improved packing, and in Fig. 3 I have shown an end view of my said packing.

Briefly described, my said invention consists of a ring packing with angular ends and a seat for said packing consisting of an annular groove with a curved end wall. When the parts are clamped together, the angular corners of the packing are forcibly wedged into the curved seats, thus providing positively-tight joints.

The ring-shaped packing is clearly illustrated in the drawings and may be automatically and cheaply made by cutting off short sections of brass or iron tubing.

Referring now to the drawings, the letter $a$ indicates the said ring packing. $b\ b'$ denote the flanges of an ordinary "union," and $c\ c'$ denote bolts and nuts by means of which the said flanges may be clamped together.

The confronting faces of the flanges $b\ b'$ are provided with annular grooves $b^2$, whose side walls are drawn together, so that the bottom of the grooves when viewed in transverse section are curved, substantially as seen at $b^3$, or otherwise recessed, so that when the packing $a$ is pressed into the groove the angular corners only of the packing will find a seat, and when the several parts of the union are clamped together the angular corners of the ring packing are forced into the gradually-narrowing portion of the grooves and become so firmly wedged therein that tight joints are assured.

In Fig. 2 I have illustrated my improved form of packing as interposed between a cylinder-head and cylinder as a substitute for the ordinary washer. In said Fig. 2 the letter $d$ indicates a portion of a steam-cylinder, $d'$ the cylinder-head, and $e\ e'$ the bolts and nuts by means of which the head is secured to the cylinder. The confronting faces of the cylinder and head are respectively formed with annular grooves $d^2\ d^3$, that are curved at their end walls, as in the device of Fig. 1 already described, and in these grooves is located the ring packing $a$.

My described packing has the desirable qualities of simplicity and cheapness of manufacture, and it may be readily applied to most, if not all, of the various forms of pipe couplings and unions now in common use.

Having thus described my invention, I claim as new and wish to secure by Letters Patent—

1. In combination, two confronting flanges provided with annular grooves having side walls whose inner ends converge toward the bottom of said grooves, a ring packing located in said grooves and means for clamping the flanges and packing together; the said packing being formed with angular ends parallel-sided that are adapted to directly engage the walls of and to be forcibly seated in the converging portions of the said grooves as the flanges are clamped together.

2. In combination two confronting flanges provided with annular grooves having parallel walls whose inner ends converge toward the bottom of said groove, a ring packing located in said grooves and formed with parallel side walls and angular ends, the angular corners of which only find a seat in said grooves, and clamping means for clamping the flanges and packing together whereby the angular corners of the packing are forced into the gradually-narrowing portion of the grooves and tightly wedged therein, substantially as and for the purpose specified.

CLARENCE C. FROST.

Witnesses:
 FRANK H. ALLEN,
 MAY F. RITCHIE.